United States Patent [19]
Brin et al.

[11] Patent Number: 5,120,105
[45] Date of Patent: Jun. 9, 1992

[54] MOTOR VEHICLE, PARTICULARLY A PASSENGER CAR, HAVING A SPOILER ARRANGEMENT IN THE REAR AREA

[75] Inventors: Constantin Brin, Stuttgart; Juergen Durm, Ditzingen, both of Fed. Rep. of Germany

[73] Assignee: Dr. Ing. h.c.F. Porsche AG, Fed. Rep. of Germany

[21] Appl. No.: 673,461

[22] Filed: Mar. 22, 1991

[30] Foreign Application Priority Data

Mar. 23, 1990 [DE] Fed. Rep. of Germany ....... 4009385

[51] Int. Cl.[5] .............................................. B62D 37/02
[52] U.S. Cl. ................................................ 296/180.5
[58] Field of Search ........................ 296/180.5, 180.1

[56] References Cited

U.S. PATENT DOCUMENTS

| | | |
|---|---|---|
| 4,756,568 | 7/1988 | Yamamoto et al. ............. 296/180.1 |
| 4,854,635 | 8/1989 | Duram et al. .................... 296/180.5 |

FOREIGN PATENT DOCUMENTS

| | | |
|---|---|---|
| 0226778 | 7/1987 | European Pat. Off. . |
| 0312709 | 4/1989 | European Pat. Off. . |
| 3615584 | 11/1987 | Fed. Rep. of Germany . |

*Primary Examiner*—Robert R. Song
*Attorney, Agent, or Firm*—Evenson, Wands, Edwards, Lenahan & McKeown

[57] ABSTRACT

In its rear area, a motor vehicle has a spoiler arrangement which can be moved by means of an adjusting device from a moved-in inoperative position into a moved-out operative position, and vice versa. In order to provide a rear-side spoiler arrangement which, while it has a simple construction, in the moved-out operative position, can be slid relatively far toward the rear and upward so that an enlarged inflow cross-section is achieved for the cooling of a rear-side air-cooled internal-combustion engine, it is provided that the spoiler arrangement comprises two parts which are hinged to one another. The part which is in the rear viewed in the driving direction is rotatably disposed on the adjacent body at its lower end, whereas the other forward part of the spoiler arrangement interacts with a guiding device arranged on the body side.

22 Claims, 3 Drawing Sheets

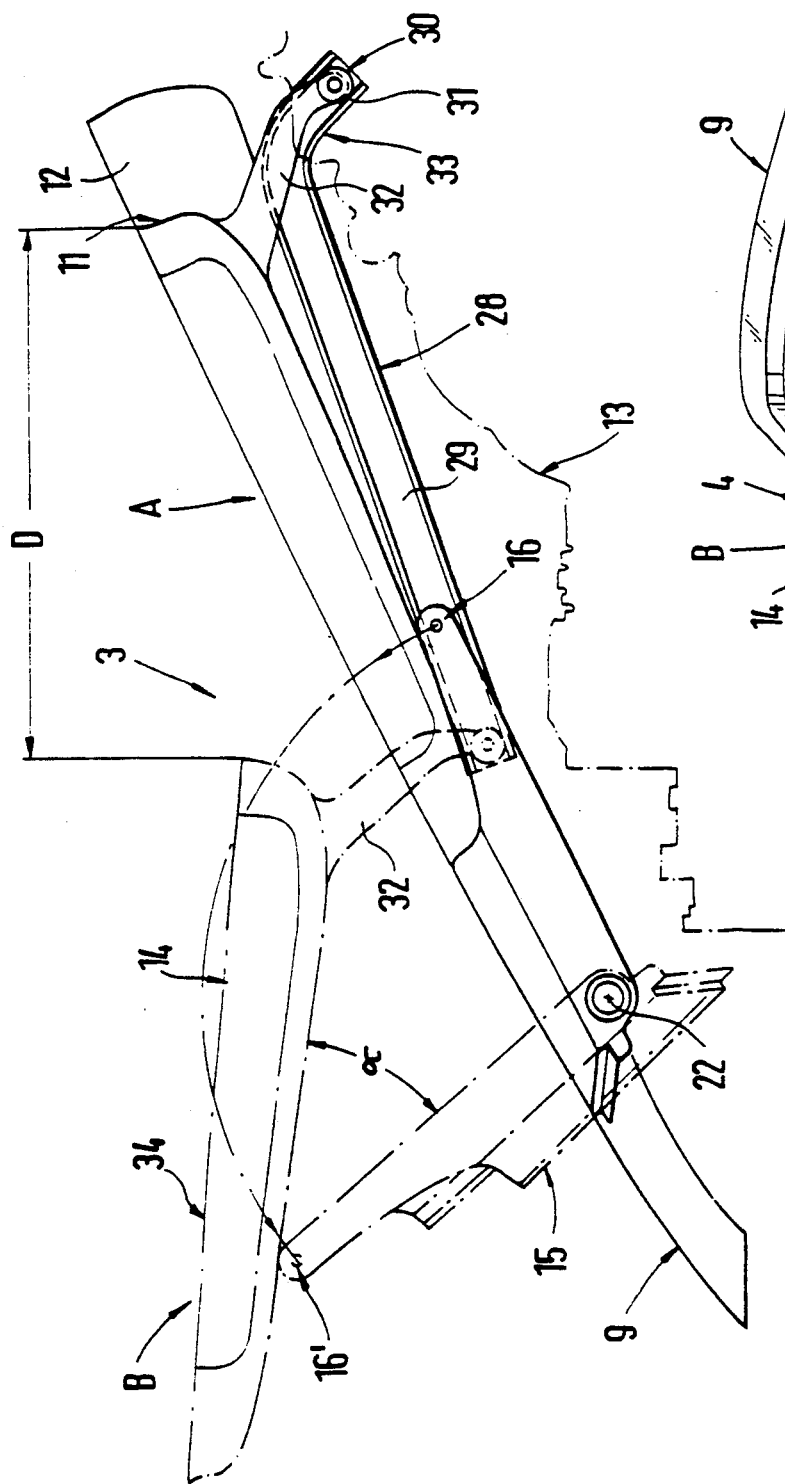
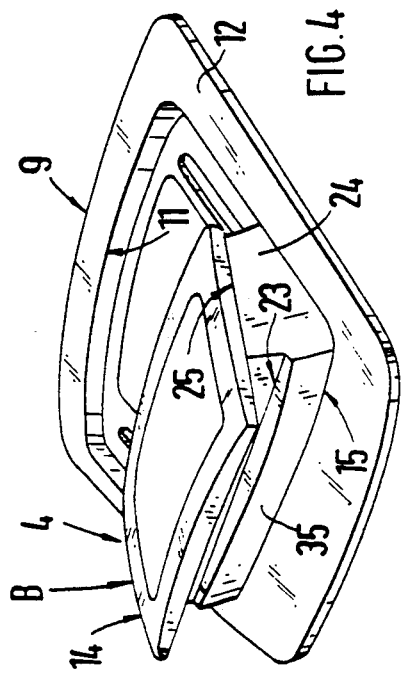

MOTOR VEHICLE, PARTICULARLY A PASSENGER CAR, HAVING A SPOILER ARRANGEMENT IN THE REAR AREA

BACKGROUND AND SUMMARY OF THE INVENTION

The invention relates to a motor vehicle, particularly a passenger car having a spoiler arrangement in the rear area which can be moved by means of an adjusting device from a moved-in inoperative position into a moved-out operative position extending at a distance to the body disposed below it, or vice versa.

A spoiler arrangement of the initially mentioned type is known from the German Patent Document DE-OS 36 15 584 and operates well.

It is an object of the invention to further develop a spoiler arrangement according to the German Patent Document DE-OS 36 15 584 in such a manner that the spoiler arrangement, while it has a simple construction, in the moved-out operative position, can be moved still farther toward the rear so that a larger inflow cross-section is created for the cooling air required for the cooling of the internal-combustion engine. In addition, a reduction of the drag coefficient is to be achieved by means of the spoiler arrangement.

According to the invention, this object is achieved by means of an arrangement wherein the spoiler arrangement viewed in the longitudinal direction of the vehicle, comprises a front spoiler part and a rear spoiler part which are hinged to one another, the rear spoiler part being pivotable at its free lower end around a pivot shaft, the front spoiler part being slidably disposed in a guiding device arranged on the body side.

Principal advantages achieved by the invention are that the spoiler arrangement, which consists of two parts which are hinged to one another, in its moved-out operative position, while the construction is simple, can be moved relatively far toward the rear and upward so that, on the one hand, a large-surface inflow opening for the cooling air for the cooling of the rear-side air-cooled internal-combustion engine is created and, on the other hand, a spoiler edge for the air flow sweeping over the vehicle is achieved that is situated far to the rear, which results in a good CW-value or drag coefficient value.

The part of the spoiler arrangement situated in the rear acts as a steering device of the adjusting device when the spoiler arrangement is moved out and moved in, and at the same time forms a transversely extending bulkhead between the horizontally aligned forward part of the spoiler arrangement and the structure disposed below it so that no exhaust gas or dirt particles can be taken in by the fan arranged on the rear side.

In the moved-in inoperative position, both parts of the spoiler arrangement extend flush with the shell of the adjacent body and form a stylistic unit with the body. The spoiler arrangement and the adjusting device consist of few components (simple construction) and are easy to manufacture.

Other objects, advantages and novel features of the present invention will become apparent from the following detailed description of the invention when considered in conjunction with the accompanying drawings

BRIEF DESCRIPTION OF THE DRAWINGS

FIG. 3 is a schematic enlarged partial sectional view of the rear area of the passenger car with the spoiler arrangement according to the invention;

FIG. 4 is a perspective view from the diagonal rear of a rear hood of the passenger car when the spoiler arrangement is moved out.

DETAILED DESCRIPTION OF THE DRAWINGS

Figure 1:
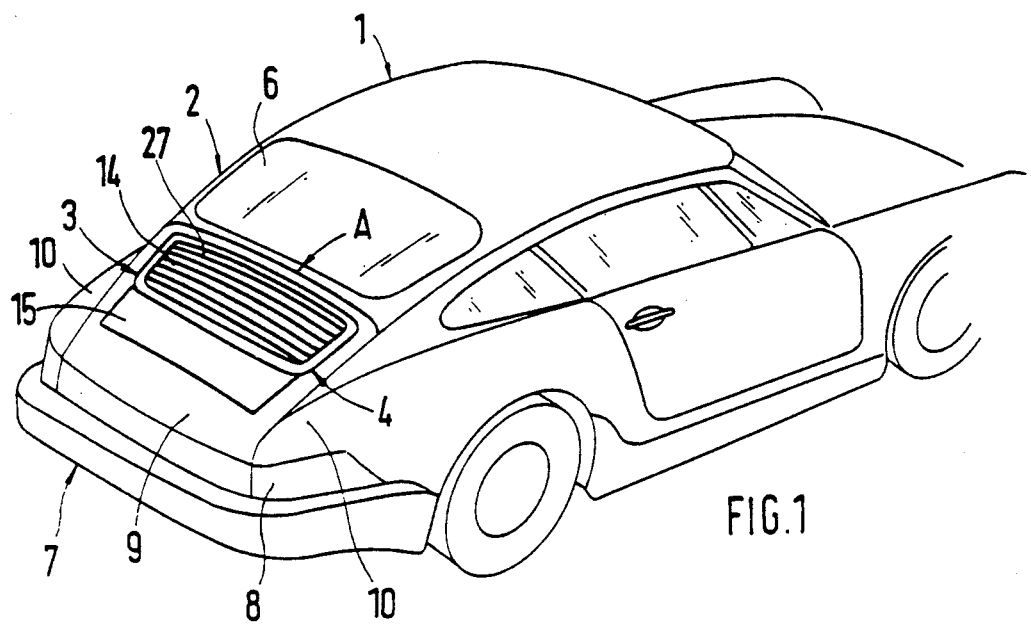
FIG. 1 is a diagonal view from the rear of a passenger car with a spoiler arrangement arranged in the rear area in the moved-in inoperative position, constructed according to a preferred embodiment of the invention.

The passenger car i comprises a body 2 with a spoiler arrangement 4 which is arranged in the rear area 3. By means of an adjusting device 5, the spoiler arrangement 4 can be moved from an inoperative position A extending flush with the adjacent body 2, by way of intermediate positions, into a moved-out operative position B, and vice versa. The spoiler arrangement 4, on the one hand, reduces the drag coefficient of the passenger car I and, on the other hand, increases the dynamic rear wheel pressure during the driving operation.

In the rear area 3, the body 2 comprises a rear window 6, a bumper 7, a taillight unit 8 and a rear hood 9. In its upper end area, the rear hood 9 is hinged on the body by means of hinges which are not shown in detail, and is laterally adjacent to side parts 10 of the body 2.

A lower edge of the rear hood 9 extends adjacent to the taillight unit 8.

The rear hood 9 has an opening 11 into which the spoiler arrangement 4 is inserted. On the circumference side, the opening 11 is surrounded by a frame 12 of the rear hood 9. Below the rear hood 9, an air-cooled internal-combustion engine 13 is outlined which is supplied with cooling air by way of a fan which is not shown in detail.

The spoiler arrangement 4 comprises two parts 14, 15 which are arranged behind one another and which, in the inoperative position A, extend flush with the shell and the contour of the fast-back design rear area 3; i.e., the two parts 14, 15, the frame 12 surrounding them, and the adjacent portions of the body 2, on the shell side, extend in a common plane. The two parts 14, 15 of the spoiler arrangement 4 represent relatively large-surface portions of the rear hood 9 which are flush with the shell and are hinged to one another at reference point 16. According to FIGS. 3 and 5, this takes place by means of a hinge 17, a hinge axis 18 being aligned horizontally and extending in the transverse direction of the vehicle. The hinge 17 comprises hinge halves 19, 20, in which case hinge halves 19 are assigned to part 15, and hinge halves 20 are assigned to part 14.

The rearward part 15 of the spoiler arrangement 4 which faces the bumper 7, at its free downward end 21, can be pivoted around a stationary rotating shaft 22, the rotating shaft 22 being aligned horizontally and extending in the transverse direction of the vehicle. In the embodiment shown, part 15 is pivotally connected at reference number 21 at the frame 12 of the rear hood 9.

The adjusting arrangement 5 for the tilting-out and 15 retracting of the spoiler arrangement 4 is applied to the rotating shaft 22. The rearward part 15 extends under the forward part 14 of the spoiler arrangement 4 when in operative A. A step-shaped extension 23 is provided on the rearward part 15. In addition, the rearward part 15, at its two exterior longitudinal sides, has side sections 24 (not shown in FIG. 3 for purposes of clarity) which extend in the longitudinal direction of the vehicle, which, in the operative position B of the spoiler arrangement 4, extend from the downward body 2 to part 14 of the spoiler arrangement 4, and close off lateral gaps. An upper boundary surface 25 of the side sections 24 is used as a supporting surface for the forward part 14 of the spoiler arrangement 4 and defines the moved-out operative position B of the spoiler arrangement 4.

Figure 2:
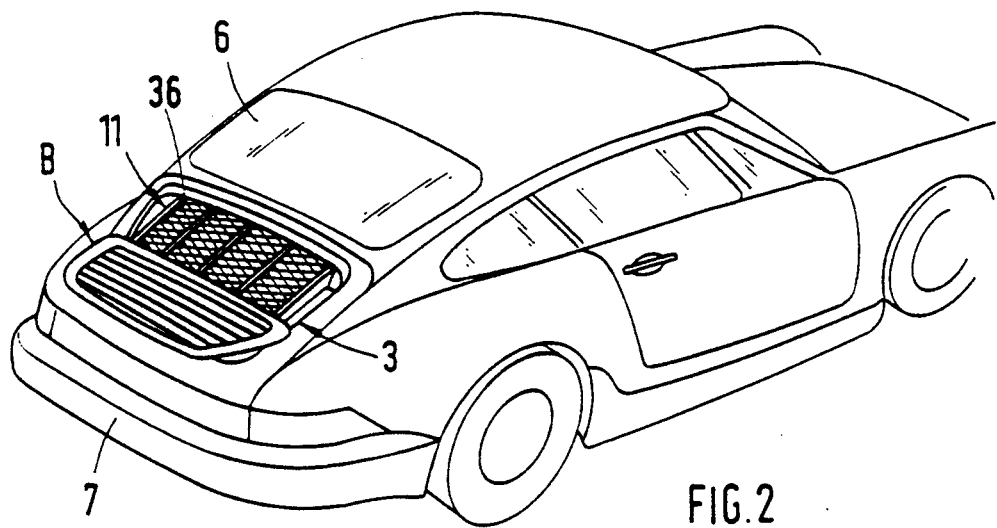
FIG. 2 is a diagonal view from the rear corresponding to FIG. 1 while the spoiler arrangement is moved out.

The forward part 14 of the spoiler arrangement 4, which has a slightly larger surface, comprises an outer circumference-side frame part 26 and an inner air inlet grid 27 which has several cross-struts (FIG. 1 and 2). In addition, part 14 is slidably guided in a body-side guiding device 28 so that, when the spoiler arrangement 4 is tilted out, a defined movement of the two parts 14, 15 takes place.

Figure 5:
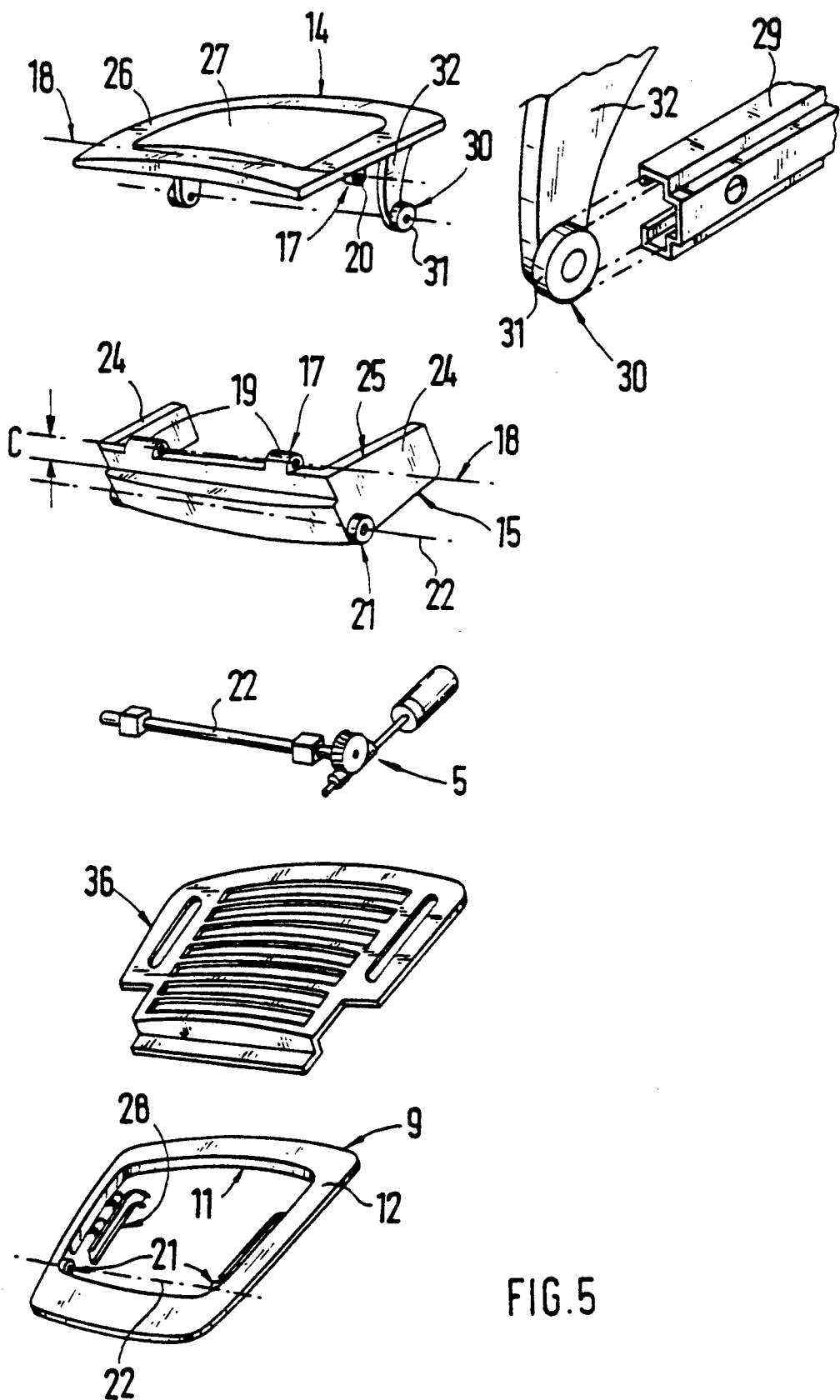
FIG. 5 is an exploded view of the components forming the spoiler arrangement, of the adjusting device and of the adjacent component parts.

The guiding device 28 comprises at least one guide rail 29 arranged on the body side which interacts with a sliding body 30 of part 14. The guide rail 29 has a U-shaped or C-shaped cross-section and, according to FIG. 5, is preferably arranged on both longitudinal sides of the frame 12. The guide rails 29 extend along lateral areas of the frame 12, specifically on the side facing the opening 11. In the embodiment shown, the sliding body 30 is constructed as a rotatable roll 31 which, on the end side, is mounted on an arm 32 of part 14 which is tilted out in the downward direction. The arms 32 are molded on in a forward area of part 14. According to FIG. 3, the guide rail 29 has a curved end area 33 which is directed downward and in which the roll 31 is situated in the inoperative position A of the spoiler arrangement 4.

The possibility also exists that the guiding device 28 is formed by a longitudinal slot provided on the body side into which a laterally tilted-out pin of part 14 engages.

When the spoiler arrangement 4 is moved out, which takes place automatically starting from a defined speed, part 15, by means of the adjusting device 5, is swivelled counter clockwise around the stationary rotating shaft 22. The hinge connection reference point 16, in this case, moves circular arc in the upward and rearward direction into position 16'. At the same time, the forward part 14, by way of the guiding device 28 or the hinge connecting reference point 16, carries out a movement toward the rear and upwards until it takes up the operative position B.

In the moved-out operative position B, the leading top surface 34 of part 14 is aligned approximately horizontally or is set slightly in the upward direction. In addition, part 14, in the operative position B, is shifted toward the rear by the measurement D.

The transversely extending rear section 35 and the two side sections 24 of part 15, in this case, form a continuous wall between the body 2 and part 14 so that no exhaust gases and dirt particles can be taken in through the fan.

A fine-meshed grid 36 is inserted into the opening 11 of the rear hood 9 below the spoiler arrangement 4 which, however, is visible only when the spoiler arrangement 4 is in a moved-out state. This grid 36 has the purpose of avoiding that larger particles may be taken in through the fan.

An important advantage of this two-part spoiler arrangement 4 is the fact that, in addition to simple kinematics, because of the large shifting path D—viewed in the longitudinal direction of the vehicle—a spoiler edge is achieved which is situated far in the rear with a good CW-value, and when the spoiler arrangement 4 is moved out, the internal-combustion engine is sufficiently supplied with cooling air because a large cooling-air inlet surface is available. In the operative position, the two parts 14, 15 are folded together according to FIG. 3 and extend at an angle $\alpha$ with respect to one another.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A spoiler arrangement for a rear area of a passenger car vehicle body comprising:
    a substantially planar front spoiler part, and
    a substantially U-shaped rear spoiler part positioned under the front spoiler part and having a transversely extending rear section and two longitudinally extending side sections,
    wherein the rear spoiler part is hingedly connected to the front spoiler part so that the front spoiler part is movable between a moved-in inoperative position and an operative position supported on top of a portion of the rear spoiler part at a spacing from adjacent vehicle body surfaces.

2. A spoiler arrangement according to 1, wherein the front and rear spoiler parts extend at least in sections flush with the shell of the adjacent body parts when in the moved-in inoperative position.

3. A spoiler arrangement according to 1, wherein the front and rear spoiler parts from sections of a rear hood which have relatively large surfaces and are flush with the vehicle body shell.

4. A spoiler arrangement according to 1, wherein the front and rear spoiler parts are continuously surrounded by a frame of a rear hood of the vehicle body.

5. A spoiler arrangement according to 1, wherein the front spoiler part faces a vehicle rear window and has an air inlet grid with several cross-struts.

6. A spoiler arrangement according to 1, wherein the side sections extend in the longitudinal direction of the vehicle and are designed such that they serve as the supporting surface for the front spoiler part in the moves-out operative position and determine the operative position.

7. A spoiler arrangement according to 1, wherein the rear spoiler part extends under the front spoiler part with a stepped section defining different support positions for supporting the front spoiler part in respective operative and inoperative positions.

8. A spoiler arrangement according to 1, wherein a section of the rear spoiler part which extends under the front spoiler part is formed by a step-shaped extension.

9. A spoiler arrangement according to 1, wherein the rear spoiler part is connected with adjacent body vehicle structure by way of a horizontally aligned pivot shaft extending in the transverse direction of the vehicle.

10. A spoiler arrangement according to 1, wherein the rear spoiler part is connected with adjacent body vehicle structure by way of a horizontally aligned pivot shaft extending in the transverse direction of the vehicle.

11. A spoiler arrangement according to 9, wherein an adjusting device of the spoiler arrangement is applied to the rotating shaft.

12. A spoiler arrangement according to 10, wherein an adjusting device of the spoiler arrangement is applied to the rotating shaft.

13. A spoiler arrangement according to 1, wherein a guiding device for the front spoiler part is formed by at least one guide rail which is stationary on the vehicle body side and in which a sliding body of the front spoiler part is slidably disposed.

14. A spoiler arrangement according to 13, wherein the guide rail extends in the longitudinal direction of the vehicle and has one of a U-shaped and a C-shaped cross-section.

15. A spoiler arrangement according to claim 13, wherein the sliding body is formed by a rotatable roller.

16. A spoiler arrangement according to claim 15, wherein the rotatable roller is arranged on a lower end of a tilted-out arm of the front spoiler part.

17. A spoiler arrangement according to claim 16, wherein two of the tilted-out arms are provided in a forward lateral exterior area of front spoiler part.

18. A spoiler arrangement according to claim 13, wherein the guide rail has a forward end area which is bent downward in a radius shape and in which the sliding body is disposed in the moved-in inoperative position of the spoiler arrangement.

19. A spoiler arrangement according to claim 1, wherein the guide rail has a forward end area which is bent downward in a radius shape and in which the sliding body is disposed in the moved-in inoperative position of the spoiler arrangement.

20. A spoiler arrangement according to claim 1, wherein a guiding device is provided on both longitudinal sides of the spoiler arrangement.

21. A spoiler arrangement according to claim 13, wherein a guiding device is provided on both longitudinal sides of the spoiler arrangement.

22. A spoiler arrangement according to claim 1, wherein the guiding device is formed by an oblong slot opening arranged on the vehicle body side into which a pin of front spoiler part engages which is tilted-away and extends in the transverse direction.

* * * * *